United States Patent
Jeantilus et al.

(10) Patent No.: US 6,865,324 B1
(45) Date of Patent: Mar. 8, 2005

(54) FIBER ARRAY WITH PASSIVE ALIGNMENT

(75) Inventors: Arden Jeantilus, Orange, NJ (US); Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/194,954

(22) Filed: Jul. 11, 2002

Related U.S. Application Data

(60) Provisional application No. 60/304,927, filed on Jul. 11, 2001.

(51) Int. Cl.[7] ................................................. G02B 6/04
(52) U.S. Cl. ...................................... 385/115; 385/120
(58) Field of Search ........................ 385/115–116, 120, 385/52, 65, 83, 137, 17, 24, 14

(56) References Cited

U.S. PATENT DOCUMENTS

| | | | | |
|---|---|---|---|---|
| 5,259,054 A | * | 11/1993 | Benzoni et al. | 385/89 |
| 5,613,024 A | * | 3/1997 | Shahid | 385/52 |
| 5,719,978 A | | 2/1998 | Kakii et al. | |
| 5,764,833 A | | 6/1998 | Kakii et al. | |
| 5,815,621 A | | 9/1998 | Sakai et al. | |
| 5,818,994 A | * | 10/1998 | Hehmann | 385/89 |
| 6,233,383 B1 | * | 5/2001 | Artigue et al. | 385/39 |
| 6,408,120 B1 | * | 6/2002 | Dautartas | 385/52 |
| 6,477,303 B1 | * | 11/2002 | Witherspoon | 385/52 |
| 6,584,250 B2 | * | 6/2003 | Lin et al. | 385/52 |
| 6,621,976 B2 | * | 9/2003 | Han et al. | 385/137 |
| 6,721,479 B2 | * | 4/2004 | Lasecki et al. | 385/52 |
| 2002/0067901 A1 | * | 6/2002 | Mukherjee et al. | 385/116 |
| 2002/0084565 A1 | * | 7/2002 | Dautartas et al. | 269/289 R |
| 2002/0114566 A1 | * | 8/2002 | Fairchild et al. | 385/33 |
| 2003/0012516 A1 | * | 1/2003 | Matsumoto et al. | 385/71 |

* cited by examiner

*Primary Examiner*—Karl D. Frech
*Assistant Examiner*—Edwyn Labaze
(74) *Attorney, Agent, or Firm*—Jonathan D. Baskin; Niels Haun

(57) ABSTRACT

A waveguide array is provided for use in optical systems requiring a two-dimensional array of waveguides. The two-dimensional array comprises a first one-dimensional array which includes a plurality of optical waveguides and at least one registration feature. The two-dimensional array also comprises a second one-dimensional array having a plurality of optical waveguides and comprising at least one detent disposed in communication with the registration feature. The detent and registration feature are provided in respective locations of the first and second one-dimensional arrays so that the conjoined first and second one-dimensional arrays provide a two-dimensional array of waveguides. In a particular configuration of the two-dimensional array, the waveguides comprise optical fibers.

17 Claims, 5 Drawing Sheets

FIBER ARRAY WITH PASSIVE ALIGNMENT

Applicants claim the benefit of priority of U.S. Provisional Application 60/304,927, filed on Jul. 11, 2001, the entire contents of which are incorporated herein by reference.

FIELD OF THE INVENTION

The present invention relates generally to an M×N fiber array, and more particularly to a 2×N fiber array comprising two N-dimensional arrays passively aligned to each other to provide a 2×N fiber array.

BACKGROUND OF THE INVENTION

Use of multiple optical channels has become prevalent in applications ranging from data communications to optical imaging in response to a need for increased system bandwidth. In addition, emerging technologies, such as optical computing, require the use of multiple optical channels to provide sufficient throughput. In many of these applications, the multiple optical channels take the form of optical fibers which communicate with other devices or other fibers of the system.

In fiber applications, alignment must be sufficiently precise to permit proper orientation among optical components, such as a fiber core of 8 microns in diameter, for example. Any misalignment between the fiber core and other system components can create an unacceptably large loss in optical signal. Coupling of optical fibers imposes alignment tolerances on the order of magnitude of the wavelength of light, for example 0.5 microns in the visible regime. Moreover, for many applications a large number of optical fibers need to be accurately aligned with other system components to effect efficient coupling between the fibers and the system components. As optical systems include a greater number of elements, the precision with which each element must be positioned relative to neighboring elements becomes more stringent in order to achieve the overall required system performance.

A fiber array provides a desirable way for handling multiple optical fibers while attempting to effect control of alignment tolerances among the fibers. In certain applications it becomes highly desirable to stack linear fiber arrays to create a two-dimensional array of optical fibers. In order to create a two-dimensional array affording acceptable alignment of the fibers, each of the linear fiber arrays must be precisely oriented relative to one another. At the same time, integration or minimization of the number of components is an important engineering design principle in the creation of such arrays. Decreasing the number of parts decreases the number of degrees of freedom of orientation among components, thereby simplifying product assembly and improving the ability to align such parts to yield an assembly that achieves desired positioning tolerances. Thus, a need exists for an efficient alignment structure to register linear fiber arrays to one another to provide a two-dimensional array of optical fibers.

SUMMARY OF THE INVENTION

In accordance with the present invention, a two-dimensional waveguide array is provided having two or more one-dimensional arrays conjoined and aligned by one or more passive alignment elements. In a first configuration of a two-dimensional fiber array in accordance with the present invention, the two-dimensional array comprises a first and a second one-dimensional array. The first one-dimensional array includes a plurality of optical waveguides and at least one registration feature. The second one-dimensional array includes a plurality of optical waveguides and comprises at least one detent. The first and second one-dimensional arrays are conjoined so that detent is disposed in communication with the registration feature to provide passive alignment of the first and second one-dimensional arrays. The detent and registration feature are provided in respective locations of the first and second one-dimensional arrays so that the conjoined first and second one-dimensional arrays are registered to one another to provide a two-dimensional array of waveguides. In a particular configuration of the two-dimensional array, the first and second plurality of waveguides each comprise a plurality of optical fibers.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 2:
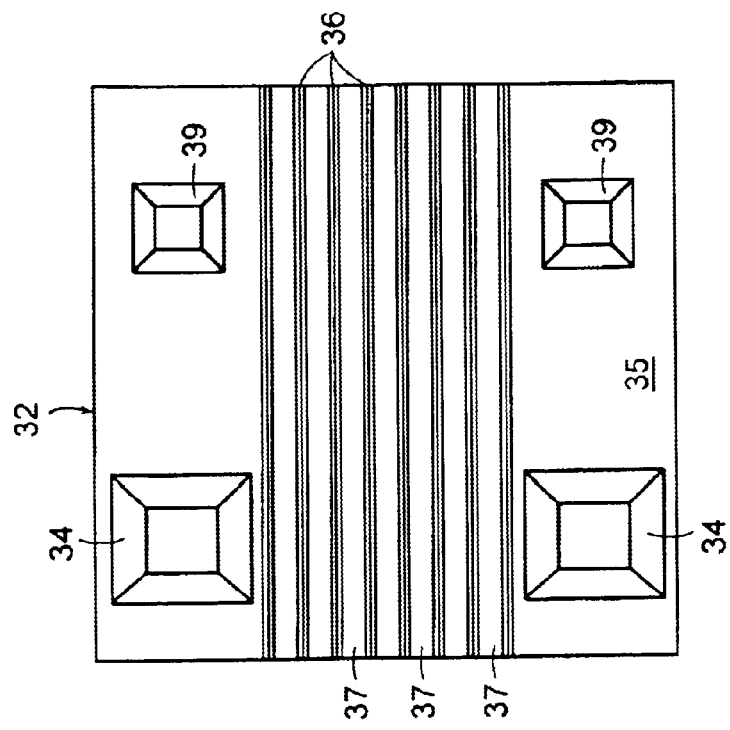
FIG. 2 schematically illustrates a top view of an alternative configuration of a basechip having a plurality of grooves for retaining optical fibers and detents for retaining registration elements.

Referring to the Figures, wherein like reference numerals refer to like elements throughout, the present invention provides a two-dimensional fiber array, generally designated 100, comprising two or more one-dimensional arrays 10, 20 registered to one another to create an M×N array of fibers, where "M" is the number of one-dimensional arrays, and "N" is the number of fibers retained within each respective one-dimensional array. Each one-dimensional array 10, 20 includes a respective basechip 12, 22 and lidchip 18, 28 which can be closed together to retain a plurality of optical fibers 52 therebetween. The one-dimensional arrays 10, 20 may be registered to one another by one or more registration elements 54 which are retained in the detents 14, 24 of the one-dimensional arrays 10, 20 to provide the two-dimensional array 100.

Figure 1:
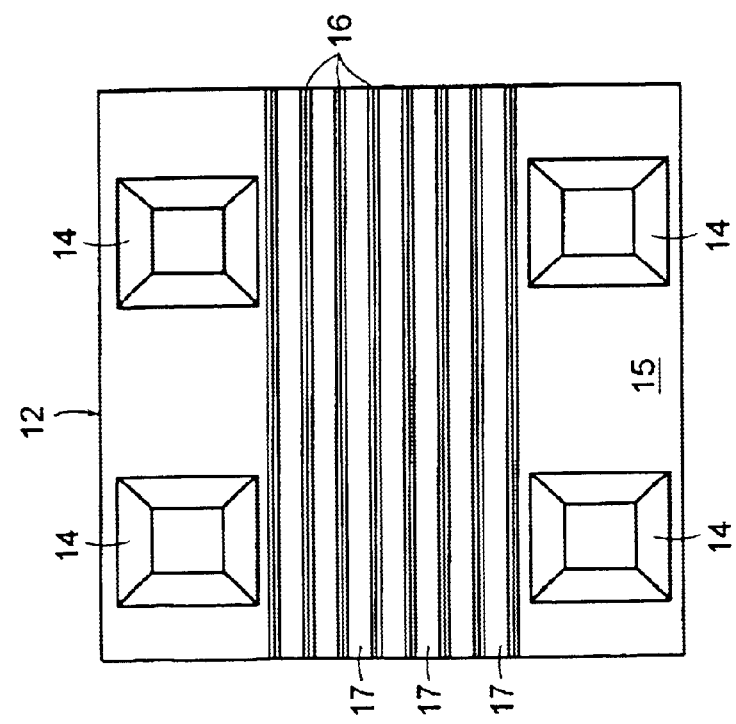
FIG. 1 schematically illustrates a top view of a basechip having a plurality of grooves for retaining optical fibers and detents for retaining registration elements.
Figure 3:
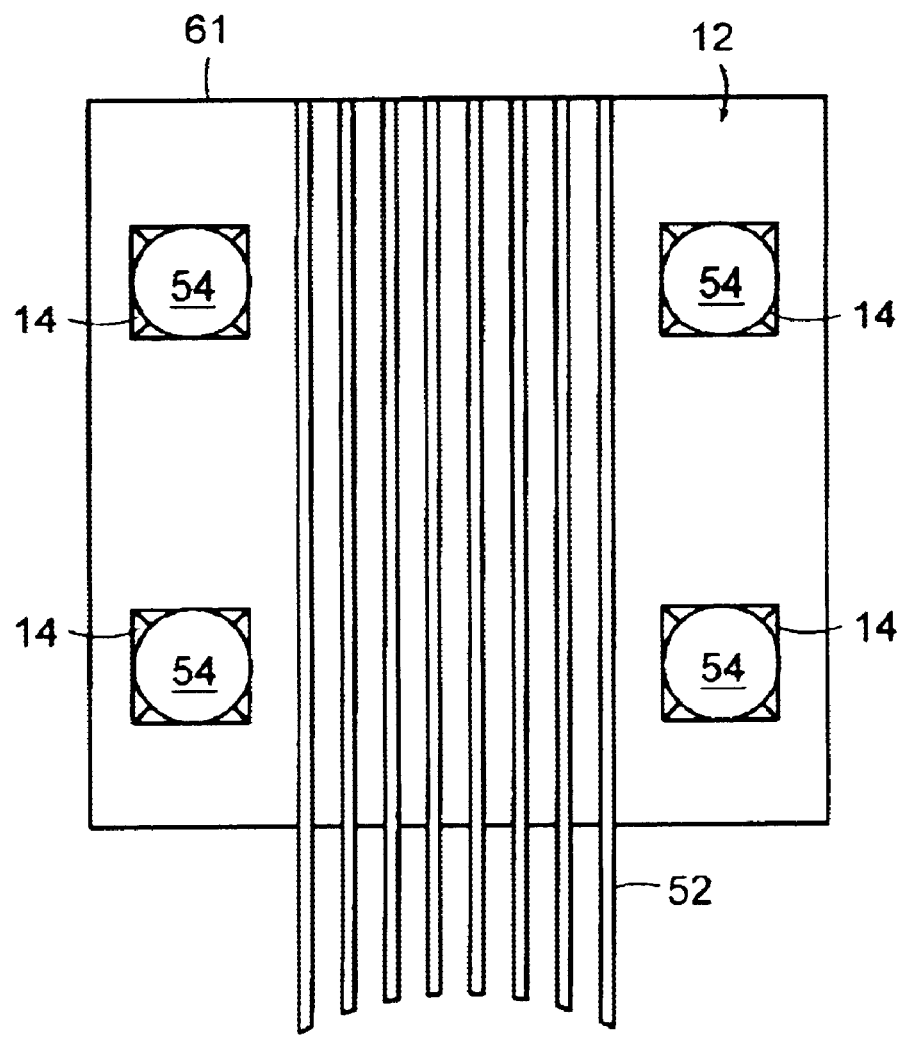
FIG. 3 schematically illustrates a top view of the basechip of FIG. 1 showing optical fibers disposed in the grooves and registration elements disposed in the detents.
Figure 4:
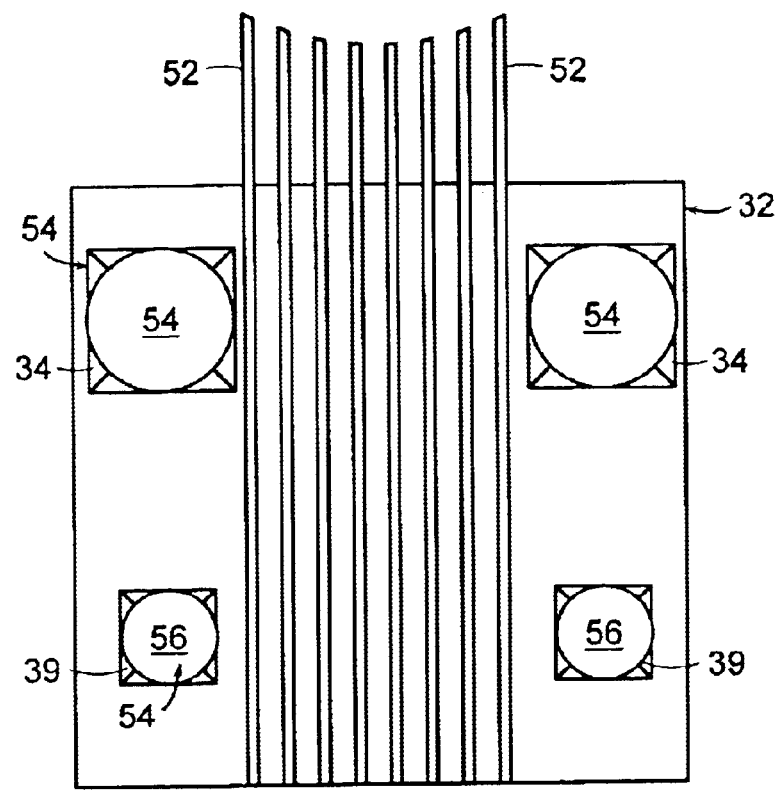
FIG. 4 schematically illustrates a top view of the basechip of FIG. 2 showing optical fibers disposed in the grooves and registration elements disposed in the detents.

In particular, with reference to FIG. 1, there is shown a basechip 12 from which the two-dimensional fiber array 100 may be assembled. The basechip 12 is illustrated as having an overall generally rectangular solid shape in which specific features are formed. Although the shape is depicted as a rectangular solid, other shapes may be utilized. As depicted in FIG. 1, the basechip 12 includes an upper surface providing a mating surface 15 for registry with a lidchip 18. A plurality of generally parallel grooves 16 is formed in the mating surface 15 extending along a longitudinal axis of the basechip 12. The grooves 16 are spaced apart from each other in the transverse direction at a predetermined pitch. The pitch may be as close together as permitted by the fabrication method in order to maximize the fiber packing density linearly across the width of the one-dimensional array 10.

Figure 6:
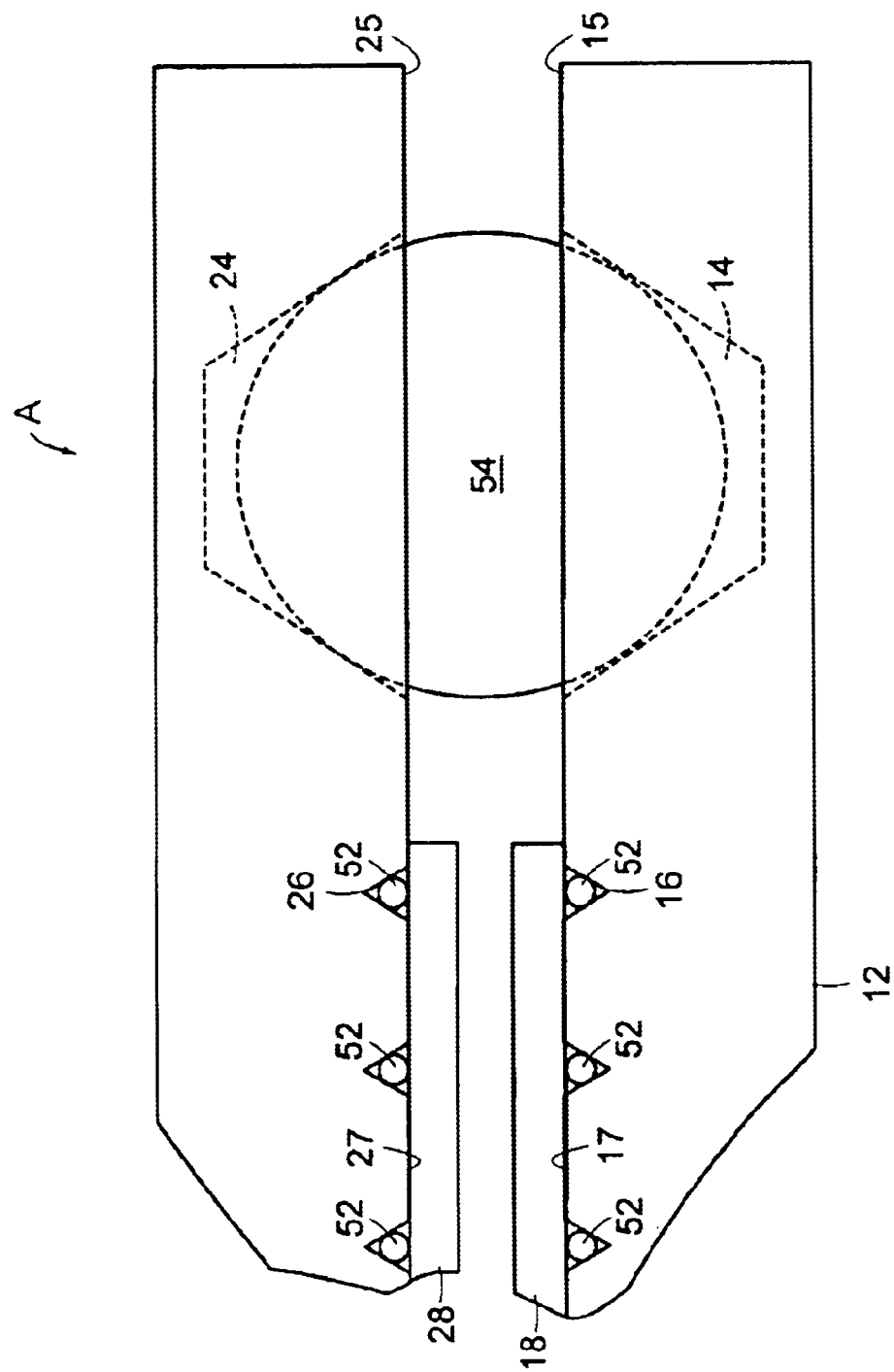
FIG. 6 schematically illustrates an enlarged view of the structure encircled in "A" in FIG. 5.

As shown in FIG. 1, the grooves 16 may be spaced apart a predetermined distance so that flat surfaces 17 of the mating surface 15 are formed intermediate the longitudinally extending grooves 16. The grooves 16 may have sidewalls that are inclined with respect to the plane of the mating surface 15. For example, the grooves may have a V-shaped cross section as depicted in FIGS. 1 and 6 or may have other shapes suitable for retaining the optical fibers 52. Such shapes may include, for example, a U-shaped cross section.

Figure 5:
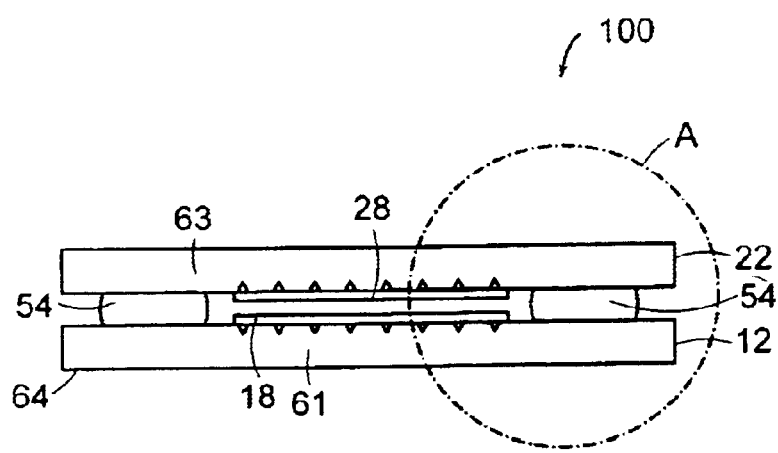
FIG. 5 schematically illustrates an end elevational view of the front face of a two-dimensional fiber array comprising two one-dimensional arrays registered to one another in generally parallel relation by the registration elements depicted in FIG. 3.

The optical fibers 52, as described herein, have a central optical core surrounded by a cladding which is covered by a jacket. The grooves 16 may desirably be dimensioned to enable an un-jacketed segment of the optical fibers 52 to be held in place by the grooves 16 when the lidchip 18 is closed onto the basechip 12, as best seen in FIGS. 5 and 6. The depth of the grooves 16 and width of the grooves 16 in the transverse direction may be selected to ensure two-point contact between the cladding and the grooves 16 as well as contact with the lidchip 18. The two-point contact with the grooves 16 of the basechip 12 and contact with the lidchip 18 facilitate precise location of the fibers within the grooves 16, which provides registration among the locations of the fibers in the grooves 16.

Alternatively, the lidchip 18 may include complementary grooves for registration with the grooves 16 of the basechip 12. In such a case, the depth of the grooves 16 in the basechip 12 should be selected so that a portion of the fibers 52 extend above the plane of the mating surface 15 of the basechip 12 for engagement with the grooves of the lidchip 18. Such a configuration of complementary grooves in the basechip 12 and the lidchip 18 provides four point contact with the fibers 54. The grooves of the conjoined basechip 12 and lidchip 18 may form a plurality of channels for retaining the fibers 52 therein. For example, conjoined V-shaped grooves create channels having a diamond-like cross section. For either configuration of the lidchip 18, with or without grooves, an adhesive may be provided between the basechip 12 and the lidchip 18 to adhere the lidchip 18 to the basechip 12. The adhesive may encapsulate and surround the fibers 54 to more securely attach the fibers 54 to the basechip 12 and lidchip 18.

As shown in FIG. 1, the basechip 12 includes at least one registration providing feature, such as detents 14 formed in the mating surface 15 of the basechip 12. Alternatively, the registration providing feature may take the form of a protrusion which extends from the mating surface 15, instead of a detent. The detent 14 may have a truncated V-shaped, i.e., U-shaped, cross-section having a generally flat bottom to permit a registration element 54, such as a ball lens or sphere, to be retained in the detent 14. Alternatively, the detent 14 may have a V-shaped cross-section in which the registration element 54 is retained. The depth of the detent 14 and the diameter of the registration element 54 are selected relative to one another so that a portion of the registration element 54 protrudes outwardly from the mating surface 15 of the basechip 12 a sufficient distance to engage detent 24 of an opposing one-dimensional array 20. The detents 14 may have similar lateral and depth dimensions or, as shown in FIG. 2, may have different dimensions. In the configuration where the registration providing feature may take the form of a protrusion, instead of a detent, such a protrusion may serve the function of the ball lens.

To create a two-dimensional array 100, at least one additional one-dimensional array may be provided for registration with and mating to the first one-dimensional array 10. For example, a second one-dimensional array 20 having the same configuration as that of the first one-dimensional array 10 may be provided, as illustrated in FIGS. 5 and 6. The second one-dimensional array 20 may include features similar to those of the first one-dimensional array 10. Like features of the second one-dimensional array 20 are labeled with 20-series reference numerals to correspond to similarly labeled features of the first one-dimensional array 10, which have 10-series reference numerals. Specifically, the second one-dimensional array 20 may include a lidchip 28 and a basechip 22 in which fiber retaining grooves 26 and detents 24 are formed. The one-dimensional arrays 10, 20 are oriented relative to one another so that their respective detents 14, 24 are in registration. The registration of the detents 14, 24 of the two arrays 10, 20 permits registration elements 54 to be disposed simultaneously in the registered detents 14, 24 of each array 10, 20. In a configuration, where the detents 14 all have similar dimensions and registration elements 54 have similar dimensions, the one-dimensional arrays 10, 20 may be oriented in generally parallel relation to each other. Alternatively, either one or both of the basechips 12, 22 may have a registration element formed in the mating surface 15, 25 thereof, in the form of a protrusion for engagement with a corresponding detent in the opposing basechip 22, 12.

A bias force may be applied to the arrays 10, 20, by a mechanism such as a spring, to hold the arrays 10, 20 in facing relation to ensure that the registration elements 54 are confined within the opposing detents 14, 24 of the respective arrays 10, 20. Alternatively or additionally, the arrays 10, 20 may be held in facing relation by an adhesive or potting compound disposed therebetween. After the two arrays 10, 20 are adhered to one another, the end faces of the fibers may be polished, along with, optionally, the side face of the two-dimensional array 100 at which the fiber end faces are disposed.

Figure 7:
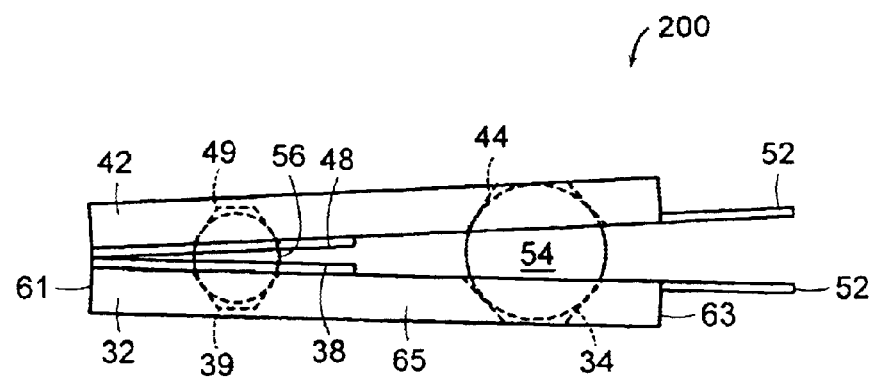
FIG. 7 schematically illustrates a side elevational view of a two-dimensional fiber array comprising two one-dimensional arrays registered to one another in non-parallel relation by the registration elements depicted in FIG. 4.
Figure 8:
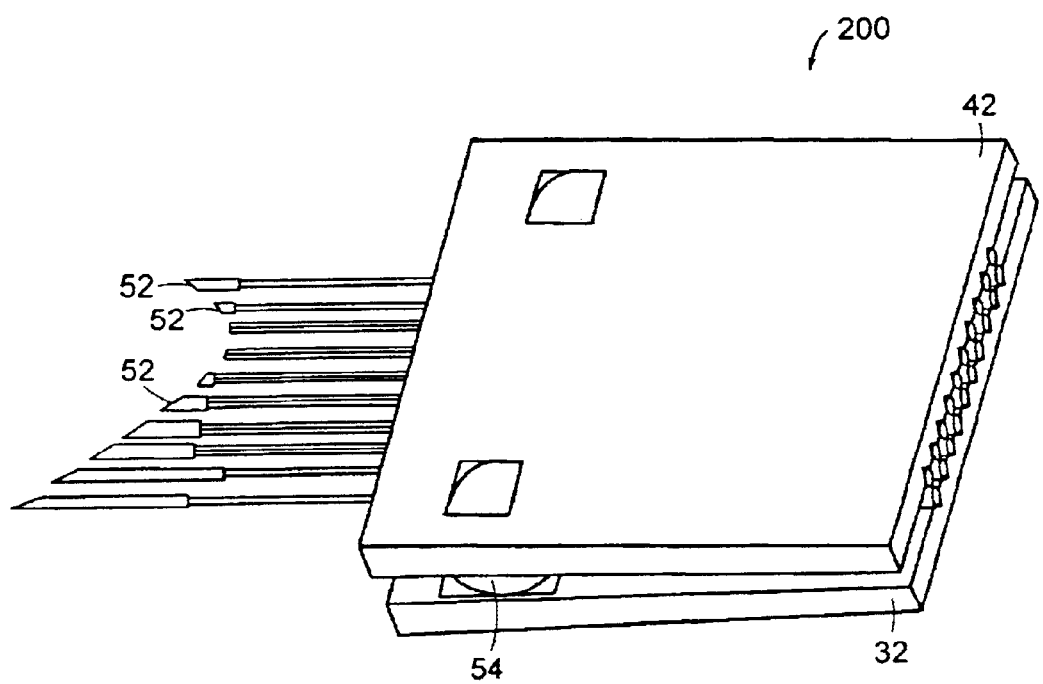
FIG. 8 is a perspective view of the two-dimensional fiber array of FIG. 7.

In an alternative configuration of a two-dimensional array 200 in accordance with the present invention, two one-dimensional arrays 30, 40 may be provided in a relative orientation that is non-parallel or tilted, as illustrated in FIGS. 7 and 8. The one-dimensional arrays 30, 40 may each have a similar configuration as that of the one-dimensional array 10 depicted in FIG. 1. As depicted in FIGS. 2, 7, and 8, like features of the two one-dimensional arrays 30, 40 are labeled with 30-series and 40-series reference numerals, respectively, to correspond to similarly labeled features of the first one-dimensional array 10, which have 10-series reference numerals. Specifically, the two one-dimensional arrays 30, 40 may each include a respective lidchip 38, 48 and a respective basechip 32, 42 in which fiber retaining grooves 36, 46 and detents 34, 44 are formed. In addition, the two one-dimensional arrays 30, 40 may differ from the first one-dimensional array 10 in that at least one detent 39, 49 has a different size from the other detents 34, 44. Alternatively or additionally, the tilted two-dimensional array 200 may differ from the non-tilted two-dimensional array 100 is that the registration elements 54, 59 may have different sizes. Providing detents and/or registration elements of different sizes permits the two one-dimensional arrays 30, 40 to be tilted with respect to one another when the respective detents 34, 44, 39, 49 are in registration and the registration elements 54, 59 are retained within the respective detents 34, 44, 39, 49. Such a configuration provides that the optical axes of the optical fibers 52 retained in the first array 30 are tilted with respect to the optical axes of the optical fibers 52 retained in the second array 40.

In such a configuration where the size of the detents 34, 44, 39, 49 and/or size of the registration elements 54, 59 varies along a direction parallel to the longitudinal axes of the grooves 36, as depicted in FIGS. 2, 7, and 8, the two one-dimensional arrays 30, 40 will be tilted relative to each other along the direction of the longitudinal axes of the grooves 36. Alternatively, in the configuration where the size of the detents and/or size of the registration elements varies along a direction perpendicular to the longitudinal axes of the grooves, the two one-dimensional arrays will be tilted perpendicularly to the direction of the longitudinal axes of the grooves.

The basechips 12, 22, 32, 42 may be formed of suitable materials having sufficient structural strength and in which features having the above described dimensions can be formed. For example, one particularly suited material is single crystal Si which may be etched by isotropic or anisotropic processes to form the grooves 16, 26, 36, 46 the detents 14, 24, 34, 44, and the optional protruding registration element. In particular, grooves 16, 26, 36, 46 having a V-shaped or U-shaped cross section may be formed by etching of <100>-oriented silicon through a mask with a solution of potassium hydroxide. The grooves 16, 26, 36, 46 and the detents 14, 24, 34, 44 can be provided in the basechip 12, 22, 32, 42 by a single mask technique, so that the location of the registration elements 54 and the fibers 52 may be accurately determined. In addition to etching processes, other milling processes used in the fabrication of microdevices may also be used. Optionally, deposition processes may be used in the creation of the basechip 12, 22, 32, 42. Such processes may be used to build up the grooves 16, 26, 36, 46 and the mating surface 15 from a base plane of the basechip 12, 22, 32, 42.

The assembly of the one-dimensional fiber array 10 begins with placement of the fibers 52 in the basechip 12 followed by attachment of the lidchip 18. The fibers 52 are prepared by removing a portion of the jacket from a first end of the fibers 52 to expose the cladding over a length of fiber at least as long as the length of the grooves 16. In addition, to permit closer spacing of the optical fiber cores, a portion of the cladding may be removed from the ends of the fibers 52 that are held within the grooves 16. If a portion of the cladding is removed, the spacing between the grooves 16 may be reduced.

Assembly of the fiber array 10 proceeds by placement of the prepared fibers 52 into the basechip 12. The un-jacketed core is placed in the grooves 16 with the first end of the fibers 52 proximate to a first open end of the grooves 16 at front face 61. The first end of the fibers 52 may be prepolished or cleaved and placed flush with the front face 61 of the fiber array 10. An appropriate adhesive and/or potting compound may be used to retain the fibers 52 within the grooves 16. An appropriate adhesive is applied to a portion of the mating surface 15 of basechip 12 to which the lidchip 18 is to be attached. The mating surface of lidchip 18 is placed in substantially facing engagement with the mating surface 15 of the basechip 12 to complete the assembly of the fiber array 10. Additionally, it may be desirable to polish the first end of the fibers 52 after the fiber array 10 has been assembled. In this case, the front faces 61, 63 of the joined basechip 12 and lidchip 18 may be polished to effect polishing of the first end of the fibers 52.

In addition to the exemplary configurations described above, more than two one-dimensional arrays of fibers may be assembled to provide a two-dimensional array in accordance with the present invention. Three or more one-dimensional arrays, such as those described above, may be stacked to form a two-dimensional array of fibers. A two-dimensional array may also be formed from a basechip that includes fiber-retaining grooves on two surfaces, such as an upper surface and a lower surface.

In addition, further features may be added to the fiber arrays to facilitate handling of the fiber arrays and registration of the fiber array 100 to other optical components. For example, one or more alignment indicia may be formed in the mating surface 15 of the basechip 12 at predetermined positions and orientations with respect to the fiber-retaining grooves 16. Complementary alignment indicia may also be formed in the adjoining lidchip 18 so that the conjoined alignment indicia form desired structures such as alignment channels. The alignment channels may extend into the front face of the array and have dimensions sufficient to receive an alignment pin, for example, associated with a device to which the fiber array is to be aligned. For example, the alignment grooves may have a V-shaped cross section and a larger width than the fiber-retaining grooves 16. Additionally, the outer surface of the two-dimensional fiber array 100, 200 may have a beveled edge to facilitate alignment of the two-dimensional array 100, 200 to other devices. For example, the beveled edge may extend along the direction of the longitudinal axis of the fiber-retaining grooves 16.

In addition, one or more of the one-dimensional arrays 10, 20, 30, 40 may contain features designed to facilitate handling of the two-dimensional array 100, 200. For example, handling channels may extend into the basechip 12 from the bottom surface 65 of the basechip 12. Such handling channels may have a V-shaped cross section. In a particular configuration, two handling channels may be provided in the basechip in an orientation transverse to the grooves 16, with one channel extending from the bottom surface 65 towards the grooves 16 so that an interior end of the channel intersects a first outer groove of the array of grooves 16 that is most proximate a sidewall of the basechip 12. The second handling channel may extend from the bottom surface 29 so that the interior end of the second handling channel intersects a second outer groove which is located furthest from the first outer groove. Thus, the handling channels provide passageways from the exterior of the basechip 12 to the two outside grooves of the basechip 12. Such passageways permit visual location of the fibers located within the two outermost grooves.

It will be recognized by those skilled in the art that changes or modifications may be made to the above-described embodiments without departing from the broad inventive concepts of the invention. For example, the front faces 61, 63 of the basechip 12 and lidchip 18 may be inclined with respect to the plane of the mating surface 15 rather than perpendicular to the mating surface 15. Such a configuration may be desirable to accommodate fibers whose end faces are polished at an angle with respect to the optical axis of the fiber. In addition, one or more of the one-dimensional arrays may comprise waveguide structures formed therein, and, therefore, need not comprise optical fibers and grooves. That is, the waveguide structures may serve a similar purpose and function as that of the optical fibers and grooves. It should therefore be understood that this invention is not limited to the particular embodiments described herein, but is intended to include all changes and modifications that are within the scope and spirit of the invention as set forth in the claims.

What is claimed is:

1. A two-dimensional optical waveguide array, comprising:
a first one-dimensional array of optical waveguides, the array having three detents disposed in a selected surface thereof;
a second one-dimensional array of optical waveguides, the second array having three detents disposed in a selected surface thereof, the second array oriented so that each detent of the second array is in registry with one of the detents of the first array to form three registered pairs of opposing detents; and
at least three registration elements having a circular cross-section, each registration element disposed between a respective pair of detents, the registration elements dimensioned so that the first and second one-dimensional arrays are tilted relative to one another to provide a two-dimensional array of waveguides.

2. The two-dimensional optical waveguide array according to claim 1, wherein waveguides of the first array each comprise an endface that is disposed at an angle with respect to the optical axis of the waveguide.

3. The two-dimensional optical waveguide array according to claim 1, wherein the arrays are tilted relative to one another along the direction of a longitudinal axis of the waveguides of the first array.

4. The two-dimensional optical waveguide array according to claim 1, wherein the arrays are tilted relative to one another along a direction perpendicular to the longitudinal axis of the waveguides of the first array.

5. The two-dimensional optical waveguide array according to claim 1, wherein the optical waveguides of the first one-dimensional array comprise optical fibers.

6. The two-dimensional optical waveguide array according to claim 5, wherein the optical waveguides of the second one-dimensional array comprise optical fibers.

7. The two-dimensional optical waveguide array according to claim 5, wherein the waveguides of the second one-dimensional array are formed in the second array.

8. A two-dimensional optical waveguide array, comprising:
a first array of optical waveguides comprising at least one registration feature; and
a second array of optical waveguides comprising at least one registration feature, the second array oriented so that each registration feature of the second array is in registry with a corresponding registration feature of the first array to provide a two-dimensional array of waveguides, wherein the first and second one-dimensional arrays are tilted relative to one another.

9. The two-dimensional optical waveguide array according to claim 8, wherein the arrays are tilted relative to one another along the direction of a longitudinal axis of the waveguides of the first array.

10. The two-dimensional optical waveguide array according to claim 8, wherein the arrays are tilted relative to one another along a direction perpendicular to the longitudinal axis of the waveguides of the first array.

11. The two-dimensional optical waveguide array according to claim 8, wherein at least one of the registration features of the first array comprises a detent and the corresponding registration feature of the second array comprises a protrusion engaged with the detent.

12. The two-dimensional optical waveguide array according to claim 8, wherein waveguides of the first array each comprise an endface that is disposed at an angle with respect to the optical axis of the waveguide.

13. The two-dimensional optical waveguide array according to claim 8, wherein the optical waveguides of the first array comprise optical fibers.

14. The two-dimensional optical waveguide array according to claim 13, wherein the optical waveguides of the second array comprise optical fibers.

15. The two-dimensional optical waveguide array according to claim 13, wherein the waveguides of the second array are formed in the second array.

16. The two-dimensional optical waveguide array according to claim 8, comprising a registration element disposed between a registration feature of the first array and a registration feature of the second array.

17. The two-dimensional optical waveguide array according to claim 8, wherein the first and second arrays each comprise a one-dimensional array.

* * * * *